Sept. 15, 1970          C. FIELD          3,528,257
METHOD AND APPARATUS FOR FREEZING
PRODUCTS AND THE FROZEN PRODUCTS Filed June 3, 1968          4 Sheets-Sheet 1

INVENTOR.
Crosby Field
BY
Curtis, Morris, & Safford
ATTORNEYS

Sept. 15, 1970
C. FIELD
3,528,257
METHOD AND APPARATUS FOR FREEZING PRODUCTS AND THE FROZEN PRODUCTS
Filed June 3, 1968
4 Sheets-Sheet 2
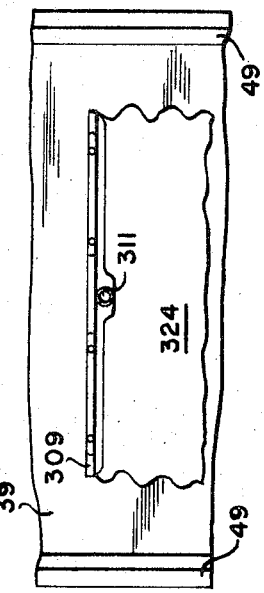
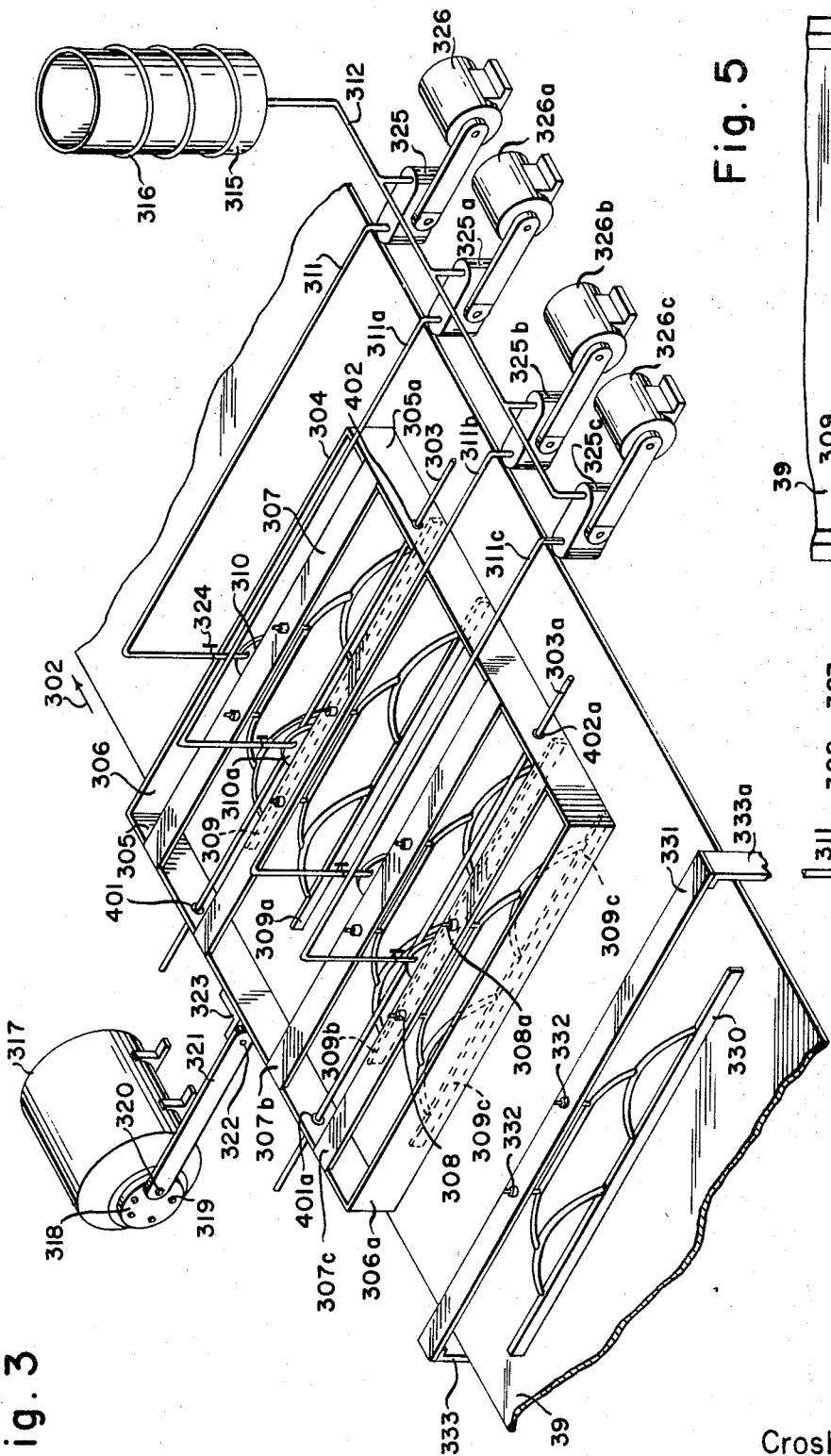
INVENTOR.
Crosby Field
BY
Curtis, Morris & Safford
ATTORNEYS

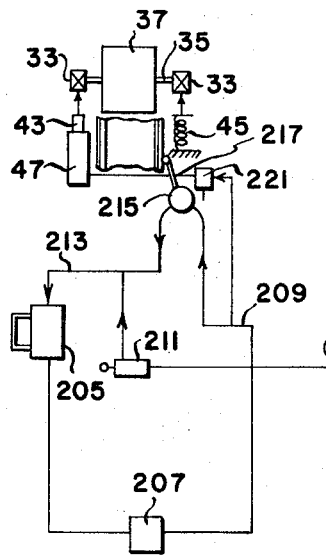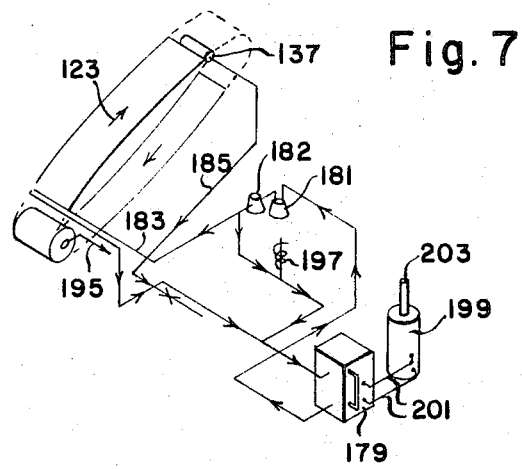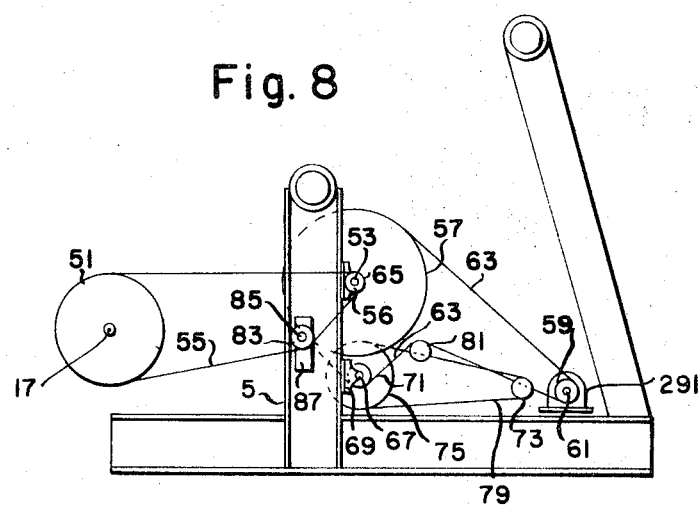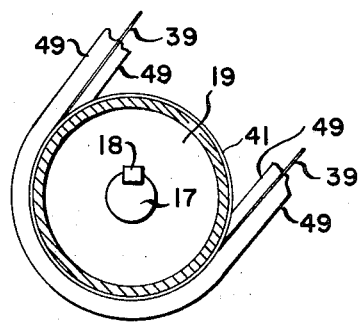

Sept. 15, 1970   C. FIELD   3,528,257
METHOD AND APPARATUS FOR FREEZING
PRODUCTS AND THE FROZEN PRODUCTS
Filed June 3, 1968   4 Sheets-Sheet 1

INVENTOR.
Crosby Field
BY
Curtis, Morris & Safford
ATTORNEYS

United States Patent Office 3,528,257
Patented Sept. 15, 1970

1

3,528,257
METHOD AND APPARATUS FOR FREEZING
PRODUCTS AND THE FROZEN PRODUCTS
Crosby Field, 8029 Harbor View Terrace,
Brooklyn, N.Y. 11209
Filed June 3, 1968, Ser. No. 734,126
Int. Cl. F25c 1/14
U.S. Cl. 62—72      20 Claims

ABSTRACT OF THE DISCLOSURE

A method and apparatus for extremely rapid freezing and the product it produces. Thin layers of product are frozen and subcooled on a flexible strip in consecutive layers. The product is then removed from the strip and processed.

SPECIFICATION

This invention relates to the art of congealing, and discloses new products, the method of producing them, and the apparatus required.

It is known that rapid freezing of many liquids, especially liquid comestibles, retains many of the constituents either lost altogether, or at the best changed in some deleterious fashion, when the liquid is frozen slowly. It has also been found that as a rule, the more rapid the freezing, the more nearly does the thawed frozen product resemble the original liquid prior to freezing.

This invention discloses a method of extremely rapid freezing, and the product it produces is superior to present fast frozen products, because it is not only frozen very rapidly, but is immediately subcooled to a degree that prevents partial melting and resultant evaporation as well s the more rapid sublimation to be found with products nearer the melting point.

For example, liquid eggs are usually frozen in cans requiring from 18 to 72 hours to complete the freezing; by the method disclosed herein several seconds are all that is required to freeze the eggs and subcool the product.

By the method and with the equipment disclosed hereinafter, a thin layer of liquid egg has been frozen in approximately two seconds, and then subcooled to the desired degree in another two to three seconds. As this product is too thin to handle as a separate ribbon or when processed into flakes, another layer of liquid egg is spread on the top of the already frozen and subcooled layer which immediately freezes to the layer beneath it, and this layer in turn is promptly subcooled. Proceeding in this fashion enough layers are added to make a ribbon of the thickness desired for subsequent handling.

As these layers are extremely thin, the total resistance to heat flow through the freezer and the layers varies little with the additional layer thus spread, as the number of layers required in most cases is small. For example, frozen ribbons of liquid egg between four and six one hundredths of an inch thick, comprising four layers, well bonded together to form a single homogeneous frozen egg ribbon, has been frozen in ten to fifteen seconds.

Subsequent handling takes one of two general forms; the frozen product may be converted into flakes, and thus packed and marketed, or the subcooled ribbons may be stacked in the form of a bar, wrapped and packaged. As long as the bar is maintained at its subcooled temperature, the ribbons will maintain their separate identity, and will thaw most rapidly, as the entire surface of each ribbon will be presented to the material being cooled. Contrast this with the present methods of thawing, requiring so long a time that bacteria growth is favored, or if the chunks of frozen material be taken from the can and broken up, labor and possible injury to the egg results.

Both the bar and the flakes disclosed herein have the advantage of large surface and quick thawing, the bar has the added advantage of having a volumetric density almost equal to that of the solid mass.

The products obtained by this invention are new, but the equipment for producing them is a substantial improvement over the equipment disclosed in my United States Letters Patents Nos. 2,610,479 and 2,610,476, issued Sept. 16, 1952; No. 2,990,196, issued June 27, 1961, and No. 3,037,366, issued June 5, 1962. Some components of the equipment disclosed in this applicaiton, moreover, are related to those disclosed in my copending application Ser. No. 691,055 (series of 1960), filed Dec. 15, 1967.

An object of this invention is to obtain improved frozen products. Another object of this invention is to produce frozen products that may be very rapidly thawed, when further processed. Still another object is to provide frozen comestibles that can be readily packaged for present day frozen food markets. These and other objects will be in part obvious and in part pointed out hereinafter.

In the drawings:

FIG. 3 illustrates diagrammatically the system employed for feeding liquid to be frozen to the freezer;

FIG. 4 is an enlarged view of a portion of FIG. 3 showing the dam structure illustrated therein in greater detail;

FIG. 5 is a sectional view taken along the lines 5—5 of FIG. 4;

FIG. 6 illustrates diagrammatically the system for tracking employed in the freezer of FIG. 1;

FIG. 7 illustrates diagrammatically the belt lubricating system also employed in the freezer;

FIG. 8 illustrates diagrammatically the drive system employed in the freezer apparatus;

FIG. 9 is a fragmentary view of the drive pulley used in the freezer shown in FIG. 1;

Figure 1:
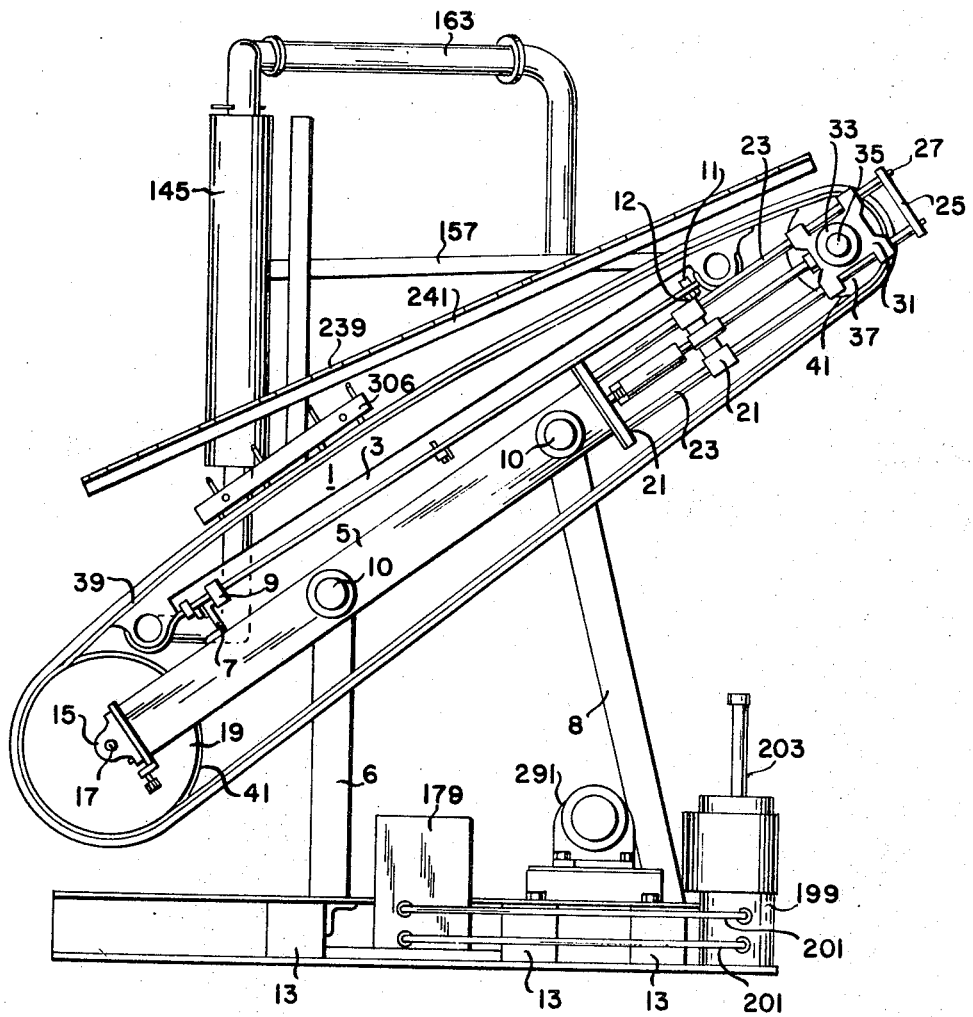
FIG. 1 shows a side elevational view of a freezer embodying my invention.

Referring particularly to FIG. 1 of the drawings, the freezer has an evaporator 1 assembled with an evaporator frame 3 in the manner more fully described hereinafter. The subassembly of evaporator 1 and evaporator frame 3 is supported by a base frame 5 bolted to it by means of brackets 7. Wooden skids 13 form an insulating foundation for the metal base frame 5. This frame has two central support members 6 and 8 which carry two centrally supported tubular arms 10, which in turn, support slant portions of the frame 5 cantilevered on both sides. The slant portion carries a freezing subassembly. The evaporator subassembly is mounted in a slant position as shown. Pads of rubber 9 provide cushioned mountings on the brackets 7 that permit final adjustment of the alignment of the evaporators 1 by means of bolts 11, which by means of their nut 12 control the compression of the pads 9.

As best shown in FIG. 1, a weldnut 21 is bolted to the upper end of frame 5 and supports four parallel guide rods 23, two on each side. The guide structure is completed by end plate 25 secured to the ends of guide rods 23 by screws 27. Bearing block 31 is bored to slide on guide rods 23, thus permitting the bearings to move longitudinally of the slant frame. Each of the pair of bearing blocks 31 has a bearing 33 for an idler shaft 35. Mounted upon a free turning shaft is an idler pulley 37. A drive pulley 19 of considerably greater diameter than the idler pulley 37 is keyed to a shaft 17, which is rotatably mounted in the pair of bearings 15 secured to the lower ends of the slant members of frame 5. Freezing belt 39 is supported by pulleys 19 and 37 and is tensioned between them as will be described more fully hereinafter. Movement of belt 39 is imparted to it by drive pulley 19. Poulleys 19 and 37 are of rigid metal and have their cylindrical faces covered by a layer 41 of an elastomer, such as rubber (see FIG. 9). Pulley 19 is driven as described hereinafter in connection with FIG. 8. The frame 5 is built so that the line between the centers of the shafts of the pulleys 19 and 37 may make with any horizontal line any angle between 45° above to 45° below horizontal. As pulley 19 turns, it drives the belt 39 so that it is drawn along the curved top surface of the evaporator. The portion of the belt in contact with the evaporator is maintained at a low temperature. As shown in FIG. 6, the belt is held under tension by rods which bear upward against bearing blocks 31. The force on the inner rod 43 is produced by a coaxial spring 45 which is screw adjusted for changing the pressure. The force on the outer rod 43 is produced by a coaxial hydraulic cylinder 47 which is automatically controlled as described hereinafter. The belt is driven by pulley 19 in a clockwise direction in FIG. 1; that is, with the upper run moving to the right.

As shown in FIGS. 4 and 5, each edge of belt 39 has bonded to it a continuous molded dam structure 49 of an elastomer, e.g., rubber. As shown in the cross sectional view of FIG. 4, this dam structure has portions on both sides of the belt; the one portion to retain the liquid or fluid 40 (product) being congealed upon the congealing surface and the other portion to retain the liquid heat transfer lubricant 42 which acts both as a lubricant and as a heat transfer agent between the metal of the belt and the evaporators. By maintaining a thin film of heat transfer lubricant on the undersurface of the belt, any irregularities in the surface in normal contact are compensated for.

The dams 49 are formed with a thinner section on the product side than on the lubricant side. This prevents the edges where the dams 49 meet the metal belt 39 at points 44 from getting cold enough for the product 40 to freeze along its edges.

From drive pulley 19, shaft 17 fastened to it by key 18, is extended inwardly beyond bearing 15 (see FIGS. 1 and 9) where sprocket 51 is keyed to it. Sprocket 51 is driven from upper jack-shaft 53 by chain 55 and sprocket 56 which is keyed to jack-shaft 53. Jack-shaft 53 is turned by sprocket 57, driven by chain 63 from motor 291, gear-motor sprocket 59 and gear motor shaft 61. Jack-shaft 53 turns in two bearings 65, bolted one on either side to the center post of frame 5. A lower jack-shaft 67 turns in two bearings 69 which are similarly bolted to the center post of frame 5. Jack-shaft 67 is turned by sprocket 71 from chain 63. A hydraulic pump sprocket 73 is driven from this jack-shaft by a chain 79 and a sprocket 75, and 73 and chain 79. The sprocket 81 of the lubricant pump is also driven by chain 63. Vertical adjustment of sprocket 81 produces the proper tension in the chain 63. Proper tension in chain 55 is maintained by vertical adjustment of bracket 87 which supports an idler sprocket 83 and its pivot 85.

REFRIGERATION OF EVAPORATOR

Figure 2:
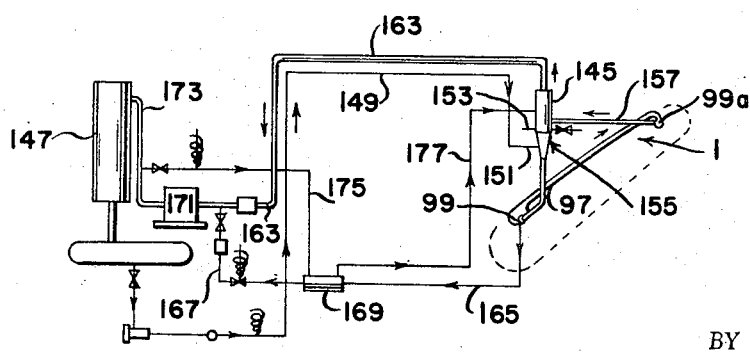
FIG. 2 illustrates diagrammatically the refrigeration system of the freezer shown in FIG. 1.

FIG. 2 is a diagrammatic representation of the refrigeration system for the evaporator 1 which omits accessories such as controls, oil separator and others well known in the art. Liquid refrigerant from condenser 147 is fed through conduit 149 into the surge drum through valve 151 which is controlled by level responsive element 153 so that the level in the surge drum is maintained at level 155, which is the optimum operating level. The refrigerant liquid flows by gravity from the surge drum into the evaporator 1. The surge drum is constructed as disclosed in my Pat. No. 3,037,366. The refrigerant vapor formed in the evaporator flows through conduit 157 into surge drum 145, displaced by liquid refrigerant under the static head at level 155. The liquid refrigerant flows thtrough an orifice in a nozzle into each of the evaporator tubes 97 to provide proper distribution of refrigerant between the tubes and to increase velocity and turbulence therein resulting in a higher rate of heat transfer as disclosed in my Pat. No. 3,037,366. The refrigerant vapor returns to the compressor 171 via the surge drum 145 where any liquid carried with it is separated out before it enters the suction line 163. Oil return is obtained by bleed off tubes 165 from the lower evaporator header through the oil still 169 and back into the suction line to compressor 171. Oil still 169 is heated by a small amount of discharge gas from compressor discharge line 173 through tubes 175 and 177 to the top of surge drum 145.

LUBRICANT SYSTEM

FIG. 7 is a diagrammatic representation of the system which maintains a thin film of heat transfer lubricant between the evaporator and the belt. This lubricant may be an anti-freeze compound such as an aqueous solution of propylene glycol. A supply of lubricant is maintained in reservoir 179. When the belt is driven, pump 181 supplies lubricant to the leading end of the evaporator 1, through filter 182 via capillary 183 and a feed block (not shown).

Pump 181 is driven by sprocket 81 as previously described with reference to FIG. 8. Used lubricant is returned to reservoir 179 via a drain line 185.

When the refrigerant flow is stopped a timer keeps the belt 39 running for a preset period. During this period solenoid valve 197 opens diverting all lubricant from the discharge of the pump 181 to reesrvoir 179 while the above described lubricant system returns the lubricant in use to reservoir 179 also to prevent loss of lubricant by overflow on shutdown.

Since the lubricant used is water soluble, it may be gradually diluted by moisture condensed from the air as the ice maker operates. Further, since the freezing point is raised by dilution, this accumulation of water must be constanting removed to avoid possible freeze-up. Since the boiling point of the lubricant and water mixture is a function of its water content a rectifier 199 is used, maintained at a practically constant temperature by means of an electric immersion heater and thermal switch. The temperature of the rectifier is set to correspond to the boiling point of the desired concentration of lubricant solution. A small convection flow in tubes 201 maintains the solution concentration in reservoir 179 substantially the same as that in rectifier 199 without heating the solution in the reservoir. Thus when the solution is diluted in the reservoir 179, it is also diluted in rectifier 199 depressing its boiling point below the rectifier temperature. The boiling in the reservoir drives water out of the solution, thus concentrating it until its boiling point reaches the predetermined rectifier temperature, at which time the boiling stops. A reflux condenser 203 having glass ball packing is used over the rectifier to minimize loss of lubricant carried off by the escaping steam.

HYDRAULIC TRACKING SYSTEM

FIG. 6 is a diagrammatic representation of the hydraulic tracking system which automatically keeps belt 39 centered on evaporator 1 and drive pulley 19 and idler pulley 37 as it runs. A reservoir 205 holds a supply of hydraulic fluid. Pump 207 (driven by sprocket 73 in FIG. 8) draws fluid from reservoir 205 to build up pressure in pressure line 209, limited by a pressure regulator 211 which bleeds into a drain line 213 to return spent fluid to reservoir 205. The belt is tracked by using this pressure in the following manner: a control valve 215 is operated by a roller arm 217 which follows the molded edge 49 of belt 39. When belt 39 starts to the left of center it causes arm 217 to turn control valve 215 so as to permit more fluid into cylinder 47 increasing the tension slightly in the left side of the belt 39 which moves the belt back to the center position. When belt 39 starts to the right of center it causes arm 217 to turn control valve 215 so as to vent fluid from cylinder 47 decreasing the tension slightly in the left side of the belt 39 which moves the belt back to the center position. Spring 45 maintains a practically constant preset tension on the right side of the belt. The changes in tension on the left side of the belt required for tracking are referenced to this tension and are so slight that they have no noticeable effect on the belt. A check valve 201 is provided between the control valve 215 and the cylinder 47. This valve remains open as long as there is pressure in line 209. When the pump stops and its pressure falls, check valve 221 closes to hold cylinder 47 in the proper position for restarting without excessive tracking movement.

FEEDING THE LIQUID TO BE FROZEN

The feed of the liquid to be frozen is all important. The liquids vary greatly in viscosity, density, surface tension, and size and amount of suspended solids. Viscosity, density, and surface tension in turn vary with the temperature range through which the liquid passes as it is being cooled on the belt just prior to freezing. In FIG. 3 there is disclosed an arrangement which is applicable to a large number of liquids.

Referring now to FIG. 3, the freezing belt 39, travelling in the direction of the arrow 302, passes under the following structure. Attached to the main frame 5 are two rods, 303 and 303a, on which slides in bearings 401 and 402, and 401a and 402a, a frame 304 comprising longitudinal members 305 and 305a, and transverse members 306 and 306a. A number of brackets 307 (307b, 307c), are attached to the longitudinal members 305 and 305a, and these carry by means of adjustable screws and nuts, such as 308 and 308a, a number of belt wipers 309, 309a, 309b, and 309c. The belt wipers are similar to automobile windshield wipers; but when intended for food freezing, the blades are made of some material other than natural rubber, such as silicone rubber.

The brackets 307, et seq., carry clamps 310, 310a, 310c, which in turn carry the open ends of the flexible tubes 311, 311a, 311b, 311c. The other end of each of these tubes 311, et seq., is connected to one of a series of pumps 215, et seq., driven by motors 326, et seq. Suction of the pumps 325, et seq., is connected through a header 312 to a reservoir 315, which holds the product to be frozen. As temperature control is a vital part of the process, reservoir 315 is maintained at the required temperature by either heating or cooling coils 316.

Frame 304 is made to reciprocate laterally by means of a motor 317, carrying a disk 318, in which are a number of holes 319, in one of which a pin 320 can be inserted, giving a reciprocating motion to the link 321, pivoted at 322 to a bracket 323 attached to the frame 304.

Valves, cocks or some similar devices, 324, 324a, 324b, 324c are used to control the flow of the liquid being frozen. With certain products, such as liquid eggs, albumen will tend to clog up the cock, requiring a greater force to drive it through the cock. For this type of product the construction shown is preferable, as it permits changes in pressure in any one line without affecting any other line, in other words, it permits independent pump action.

The method of operation is: the liquid to be frozen, 328 is fed through the tube 311 (see FIG. 5) and is spread by the wiper blade 309 forming a small puddle in front of the wiper, where it is instantly frozen (324). It is scalloped on the edges because of the reciprocating motion of the wiper described hereinabove. The size of these "scallops" can be controlled, as the amount of reciprocation is controlled by the hole 319 in which the pin 320 is placed, as each hole 319 is at a different radius from the center of the disk.

In case, during adjustment, or because of some other incident not normal to the operation, some liquid overflows the ends of the wipers 309, it is caught by longer stationary wiper 330, held by bar 331 by adjustable screws and nuts 332. Bar 331 is attached to the main frame 5 of the machine by brackets 333, 333a.

For certain products, because of lesser viscosities, the product to be frozen may be flowed on to the belt 39 through a nozzle attached to each of the tubes 331, et seq. These nozzles may be made of glass, stainless steel or other special material.

The reciprocating of the wipers prevents the blades from being frozen to the moving belt by the quick freezing of the liquid; it also assists materially in flowing the liquid towards the ends of the blades, and producing a thin film of uniform thickness to be frozen.

Figure 10:
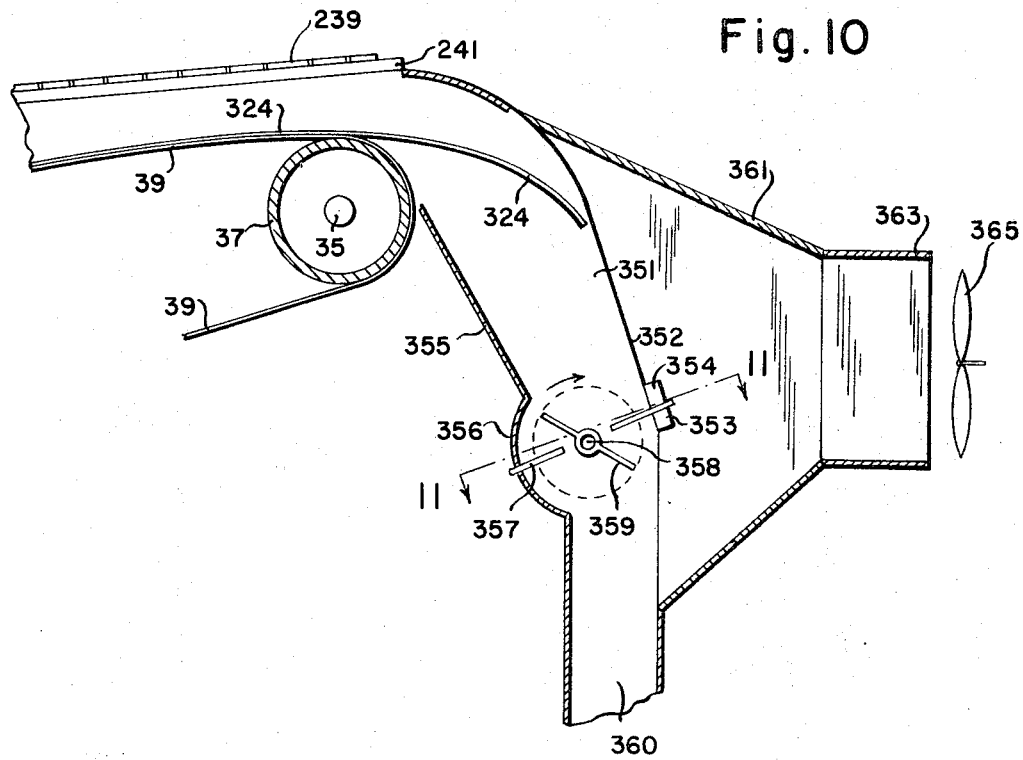
FIG. 10 illustrates diagrammatically apparatus to make flakes from the frozen ribbons formed in accordance with the teachings of my invention.

Referring now to FIG. 10, it will be seen that the frozen product 324 is in the form of a homogeneous ribbon, sufficiently thick to peel from the belt 39 as it passes over the deflecting pulley 37, as it has been built up during freezing as described hereinabove by spreading upon a quick frozen and subcooled extremely thin ribbon another thin liquid ribbon, which in turn is very rapidly frozen; and this process has been continued until the ribbon is sufficiently thick to permit peeling of the frozen composite ribbon. It may be discharged into a cold room, and then broken or cut into lengths manually or by a machine. These ribbons may be stacked and wrapped and sold as a bar. If the bar has been kept at the required subcooled temperature throughout the handling, packing and storage, the individual ribbons will not freeze or stick together, and when the package is opened, the individual ribbons will separate and present to the material being processed the complete surface of each individual ribbon. The entire bar will then thaw extremely rapidly.

Figure 11:
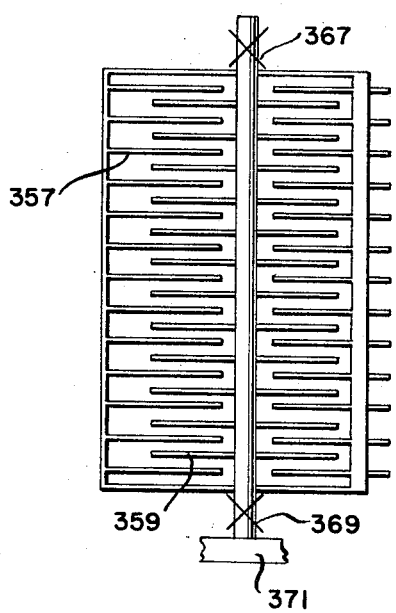
FIG. 11 is a sectional view of the line 11—11 of FIG. 10.

To further process the ribbons into flakes, (see also FIG. 11), a chute 351 is provided against one side 352 of which ribbon 324 rubs and breaks into relatively large pieces which fall until they are caught by pins 354 and 357, held in brackets 353 in the sides of the chute 351. Pins 359, rapidly rotating on shaft 358 break these pieces of frozen material into flakes, by hurling them against the stationary pins 354 and 357, whereupon the flakes thus formed fall through the outlet 360 into a refrigerated storage. Shaft 358 is driven by pulling 371 and turns in bearings 367 and 369.

To prevent the subcooled ribbon touching a warm side of the chute an evaporator 363 is provided and a duct 361, together with a fan 365 blowing the air through the evaporator and thence against the chute 351. This air is circulated all about the chute, and the methods of doing this are so well known in the art that they are not further described herein.

Figure 12:
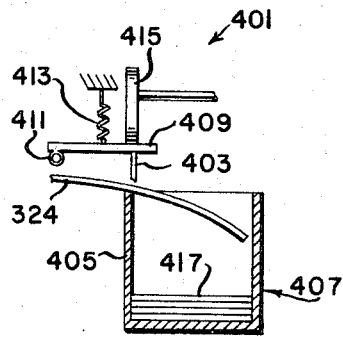
FIG. 12 is a schematic view of an arrangement for cutting the frozen ribbons of this invention into strips.

In the embodiment of FIG. 12 an arrangement is provided for cutting the ribbon 324 into predetermined lengths and assembling them in subcooled condition for storage and shipment. With this arrangement a cutter unit 401 has a cutter blade 403 positioned adjacent the side wall 405 of an assembly tray 407. Knife 403 is carried by a mounting arm 409 which is swingably supported by a pivot 411. A tension spring 413 urges arm 409 upwardly and a rotary cam 415 is turned at spaced intervals of time to swing knife 403 downwardly against the tension of spring 413. During each downward movement knife 403 severs the end of ribbon 324 and produces a rectangular sheet 417 of the frozen product. Ribbon 324 is shown in FIG. 12 as it projects from the freezing surface and is moving at a constant speed. The interval between successive impacting actions of cam 415 is such as to permit the desired length of the robbon to project beyond the knife to substantially the opposite wall 419. Hence, the ribbon 324 is cut into predetermined lengths and the sheets are assembled in a stack. When a predetermined number of the sheets have been assembled the stack is removed and packaged. The entire assembly of FIG. 12 is positioned within the subfreezing atmosphere of the air stream in hood 361 and the packaging operation is also at a subfreezing temperature.

The present invention is applicable to a wide range of products, i.e., eggs or the yolks or whites of eggs, fruit and vegetable juices, coffee, cream, and various liquid and viscous products. The term "freezing" as used herein covers the broad range of congealing fluid products. The water in such products is frozen into small crystals. In general, each film freezes immediately and is "dry" as it moves beneath the next set of wipers. Illustratively, for products such as eggs, the thickness of each film of the fluid is of the order of .01" to .02" and the ribbon is peeled at a thickness of the order of .05" to .25". For most products, the ribbon has at hickness which is not greater than .1". As a specific example, when freezing coffee having 10% solids by weight the film thickness is .005" to .01" and the ribbon is peeled at .04" to .05".

What is claimed is:

1. In the art of freezing prodacts, the steps of, producing a subfreezing temperature condition upon a flexible surface, depositing a stream of the fluid to be frozen onto said surface at a zone spaced from opposite side edges thereof, imparting to the fluid at said zone relative motion with respect to said surface to spread the fluid toward said side edges to a depth of the order of .005" to .02" thereby to form a first layer of fluid while simultaneously moving said surface with said layer thereon parallel to said side edges toward a second zone and permitting said first layer of fluid to freeze to produce a first frozen layer, depositing a second stream of the fluid onto said first frozen layer at said zone to a depth of the order of .005" to .02" imparting to the fluid at said second zone relative motion with respect to said surface to spread the fluid toward said side edges to a predetermined depth thereby to form a second layer of the fluid over said first frozen layer, permitting the fluid of said second layer to freeze and thereby to form a composite frozen layer comprising said first frozen layer and said second layer, and deflecting said surface to peel it away from said composite frozen layer.

2. The method of freezing eggs which comprises the steps described in claim 1 wherein each film of the fluid has a thickness of the order of .01" to .02".

3. The method as described in claim 2 which includes additional steps of depositing and spreading and freezing additional frozen layers to form a composite layer having a thickness of the order of .05" to .25".

4. The method of freezing coffee having solids of order of 10 percent by weight and the remainder water which comprises the steps described in claim 1 wherein each film of the fluid has a thickness of the order of .005" to .01".

5. The method as described in claim 2 which includes additional steps of depositing and spreading and freezing additional frozen layers to form a composite layer having a thickness of the order of .04" to .05".

6. In the art of freezing products, the steps of, producing a subfreezing temperature condition upon a continuous flexible surface having side edges, moving said surface along a freezing path parallel to said side edges to a peeling zone, depositing a stream of the fluid to be frozen onto said surface at a zone along said path spaced from said side edges, imparting to the fluid at said zone relative motion with respect to said surface to spread the fluid toward said side edges to a predetermined depth thereby to form a first layer of fluid, permitting said first layer of fluid to freeze to produce a first frozen layer, depositing a second stream of the fluid onto said first frozen layer at a second zone, imparting to the fluid at said second zone relative motion with respect to said surface to spread the fluid toward said side edges to a predetermined depth thereby to form a second layer of the fluid over said first frozen layer, permitting the fluid of said second layer to freeze and thereby to form a composite frozen layer comprising said first frozen layer and said second layer, and deflecting said surface at said peeling zone to peel it away from said composite frozen layer.

7. In apparatus for producing a frozen product, the combination of, a flexible metal belt presenting a freezing surface, belt-mounting means for said belt and including means to move said belt through a product freezing zone, and means to deposit the product in separate zones spaced longitudinally along said belt within said freezing zone and spreader means at each of said separate zones which moves to impart spreading movement to the product transversely of the belt thereby to form a plurality of films of the product to be frozen onto said surface at said separate zones along the path of said belt within said freezing zone whereby the product is frozen into a composite layer formed by a plurality of successive frozen films, said belt-mounting means including means to deflect said belt as the belt moves from said freezing zone to thereby peel the belt away from the product.

8. Apparatus as described in claim 7 which includes spreader means to aid in producing thin films of the product being deposited on the belt.

9. Apparatus as described in claim 8 wherein said spreader means comprises elongated wiper blades extending transversely of the direction of movement of said belt.

10. Apparatus as described in claim 9 which includes fluid depositing means to deposit a stream of the fluid onto said belt immediately after the belt has moved past each of said wiper blades.

11. Apparatus as described in claim 7 wherein said belt-mounting means comprises an evaporator plate having an elongated refrigerated surface extending through said freezing zone and of substantially uniform longitudinal contour, a pair of mounting rollers positioned respectively at the ends of said refrigerated plate with the belt passing around a first roller when moving to said freezing zone and passing around a second roller when moving from said freezing zone, said first roller comprising a driving roller for moving said belt and said second roller being of lesser diameter than said first roller and flexing said belt for the removal of the frozen product therefrom.

12. Apparatus as described in claim 11 which includes means to supply refrigerant to one end of said evaporator plate and to withdraw refrigerant from the other end of said evaporator plate.

13. Apparatus as described in claim 11 which includes means to supply a lubricating fluid between said evaporator plate and said belt and to withdraw the lubricating fluid downstream along the belt.

14. In apparatus for producing a frozen product, the combination of, a flexible metal belt presenting a freezing surface, belt-mounting means for said belt and including means to move said belt through a product freezing zone, means to deposit a plurality of films of the product to be frozen onto said surface at a plurality of zones along the path of said belt within said freezing zone whereby the product is frozen into a composite layer formed by a plurality of successive frozen films, said belt-mounting means including means to deflect said belt as the belt moves from said freezing zone to thereby peel the belt away from the product, and spreader means to aid in producing thin films of the product being deposited on the belt comprising elongated wiper blades extending transversely of the direction of movement of said belt, said fluid depositing means depositing a stream of the fluid onto said belt immediately after the belt has moved past each of said wiper blades, the apparatus including mounting means for said wiper blades and means to oscillate said mounting means to move said wiper blades longitudinally of themselves.

15. Apparatus as described in claim 14 which includes means to pass a stream of subcooled air along the surface of the product passing through and away from said freezing zone.

16. Apparatus as described in claim 14 wherein said product is a food product which is deposited in liquid form, a supply tank for the liquid, means to maintain a predetermined temperature condition of liquid within said tank, pump means to withdraw liquid from said tank, and tube means extending to each of the zones where the liquid is deposited on the belt.

17. Apparatus as described in claim 14 wherein said mounting means is a rectangular rack, and a crank arm assembly connected to oscillate said rack.

18. The art as described in claim 1 which includes the additional step of breaking the frozen product in a subfreezing atmosphere to form frozen particles of the product.

19. The art as described in claim 1 which includes additional identical steps for freezing successive layers of the frozen product.

20. The art as described in claim 1 wherein the flexible surface is the top surface of a moving refrigerated belt.

References Cited
UNITED STATES PATENTS

| | | | |
|---|---|---|---|
| 1,309,995 | 7/1919 | Bates | 62—345 |
| 1,528,043 | 3/1925 | Bennett | 62—72 |
| 3,037,366 | 6/1962 | Field | 62—345 |
| 3,253,420 | 5/1966 | De George | 62—72 |

WILLIAM E. WAYNER, Primary Examiner

U.S. Cl. X.R.

62—345; 99—196